United States Patent

[15] 3,673,241

Marxer

[45] June 27, 1972

[54] SUBSTITUTED BENZALDEHYDE GUANYLHYDRAZONES

[72] Inventor: Adrian Marxer, Binningen, Switzerland

[73] Assignee: Ciba Corporation, Summit, N.J.

[22] Filed: March 25, 1969

[21] Appl. No.: 810,386

[30] Foreign Application Priority Data

April 4, 1968 Switzerland ..........................4998/68
Feb. 21, 1969 Switzerland ..........................2682/69

[52] U.S. Cl.................260/501.12, 260/501.11, 260/501.14, 260/552 R, 260/553 A, 260/553 C, 260/999, 260/340.9, 424/316, 424/319, 424/322
[51] Int. Cl. ..........C07c 127/16, C07c 129/08, C07c 133/10
[58] Field of Search ..........260/553 A, 553 C, 564 F, 501.11, 260/501.12, 501.14, 552 R

[56] References Cited

UNITED STATES PATENTS 2,584,784  2/1952  Biswell..........................260/564 F X
3,349,099  10/1967  Marxer..........................260/564 F X Primary Examiner—Bernard Helfin
Assistant Examiner—Norman Morgenstern
Attorney—Harry Goldsmith, Joseph G. Kolodny and Mario A. Monaco

[57] ABSTRACT

Compounds of the formula

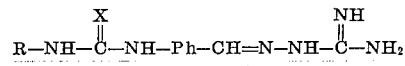

in which R represents an optionally substituted hydrocarbon radical, X represents oxygen or sulphur and Ph a phenylene radical, are useful for the treatment of cardiac insufficiency and as antihypertensive agents.

14 Claims, No Drawings

SUBSTITUTED BENZALDEHYDE GUANYLHYDRAZONES

SUMMARY OF THE DISCLOSURE

The present invention relates to new substituted benzaldehyde guanylhydrazones. Especially it concerns guanylhydrazones of the formula (I)   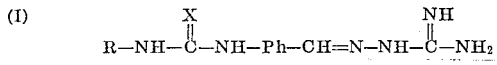

in which R represents an unsubstituted or substituted hydrocarbon residue, X represents oxygen or sulphur and Ph a phenylene residue, and salts thereof with pharmaceutically acceptable acids.

The phenylene residue Ph is preferably an m-phenylene residue and in the first place a p-phenylene residue. It may be unsubstituted or contain one, two or more identical or different substituents. Suitable substituents are primarily alkyl or alkoxy radicals, halogen atoms or trifluoromethyl groups.

A possibly substituted hydrocarbon residue R is, for example, an aryl or aralkyl radical or a saturated hydrocarbon residue.

An aralkyl radical is in the first place a phenyl-lower alkyl radical, such as a 1- or 2-phenylethyl or benzyl residue. An aryl radical is primarily a phenyl residue. The said aryl and aralkyl radicals may be unsubstituted or contain in the aromatic ring one, two or more identical or different substituents. Preferred substituents are alkyl or alkoxy radicals, halogen atoms or trifluoromethyl groups.

A saturated hydrocarbon residue R is more especially a lower saturated hydrocarbon residue, for example a cycloalkyl, cycloalkyl-alkyl or alkyl radical.

Cycloalkyl and cycloalkyl-alkyl radicals are especially those containing three to seven cyclic members, such as cyclopropyl, cyclopentyl, cyclohexyl or cycloheptyl residues, or cyclopropyl-cyclopentyl-, cyclohexyl- or cycloheptylmethyl, -ethyl or -propyl residues. Alkyl radicals are in the first place lower alkyls, preferably those which contain one to seven carbon atoms, for example methyl, ethyl, propyl or isopropyl groups, or linear or branched butyl, pentyl or hexyl residues which may be linked in any desired position.

Alkoxy radicals are primarily lower alkoxy radicals, e.g., those containing one to seven carbon atoms, for example, methoxy, ethoxy, propoxy or isopropoxy groups, or linear or branched butoxy, pentoxy or hexoxy groups.

Suitable halogen atoms are especially fluorine, chlorine bromine, or iodine atoms.

The new compounds possess valuable pharmacological properties, in particular they have an effect on the circulation. For example, they bring about an increase in the contraction power of the heart muscle, as can be shown on the isolated papillares of the cat and on the isolated guinea pig's auricle of the heart, in concentrations of 1 to 100 γ/ml. An especially good, positive inotropic effect is shown by compounds in which R represents an aryl radical, as can be shown in animal experiments, for example in the cat on intravenous administration of a dose of from 0.3 to 10 mg/kg by measuring the contraction power by means of expansion strip charts attached to the left ventricle. The compounds in which R represents a saturated hydrocarbon radical, such as an alkyl radical, show in addition to the above effect especially a good antihypertensive activity, as can be shown in animal experiments, for example in the renal hypertonic rat on oral administration of 10 to 200 mg/kg. Furthermore, they have an evacuating effect on the catecholamine depots, as can also be shown in animal experiments, for example on oral administration to the rat of 0.3 to 100 mg/kg. The new compounds have a low toxicity.

In conformity with their effects, the new compounds are useful for the treatment of cardiac insufficiency and as antihypertensive agents, respectively. In addition, they have also an antiphlogistic effect. The new compounds are also valuable intermediates for the manufacture of other useful substances, especially of pharmacologically active compounds.

Special mention deserve the compounds of the formula

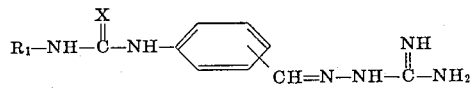

in which the gyanylhydrazone grouping is in the ortho- or especially meta- or para-position, X represents sulphur or preferably oxygen and $R_1$ a lower saturated hydrocarbon residue, for example one of those mentioned above, especially a lower alkyl radical, and in the first place the compounds of the formula

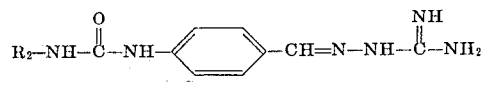

in which $R_2$ represents a lower alkyl radical.

Of particular interest because of their antihypertensive activity are the compounds of the formula

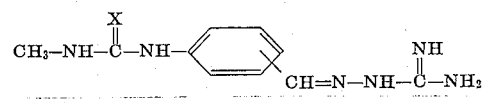

in which the guanylhydrazone grouping is the ortho- or more especially in the meta- or para-position and in which X stands for sulphur or preferably oxygen, and particularly p-(N'-methylureido)-benzaldehyde-guanylhydrazone of the formula

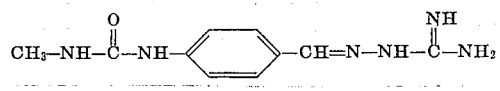

which, for example in the form of its hydrochloride, given orally to renal hypertonic rats in doses of 10 to 60 mg/kg produces a distinct antihypertensive effect.

Particularly outstanding on account of their positive inotropic effect are the compounds of the formula

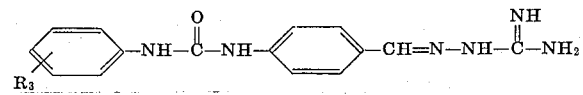

in which $R_3$ represents a lower alkyl group, especially methyl, a lower alkoxyl group, especially methoxy, a halogen atom, especially chlorine, or a hydrogen atom, and especially p-[N'-(ortho-tolyl)-ureido]-benzaldehyde-guanylhydrazone, and para-(N'-phenylureido)-benzaldehyde guanylhydrazone which, for example in the form of its hydrochloride has a pronounced positive inotropic activity when given intravenously to the cat in a dosage of 0.3 to 1 mg/kg.

The new compounds are manufactured in known manner. Preferably, in a compound of the formula

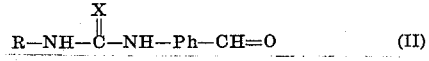

in which R, X and Ph have the above meanings or a reactive functional oxo derivative thereof is reacted with guanylhydrazine.

Reactive functional oxo derivatives are for example the acetals, hydrates or their esters (acylals), oximes, imines or bisulphite adducts.

The guanylhydrazine is preferably used in form of one of its salts, such as a monosalt, and the reaction is conducted in the presence of a small quantity of acid, or the free guanylhydrazine is used and the reaction is performed in the presence of a slight excess of acid.

A resulting N-R'-thioureido-guanylhydrazone may be converted into a corresponding N-R'-ureido-guanylhydrazone, for example by hydrolysis, such as treatment with water.

The hydrolysis is performed in the usual manner, preferably in the presence of an oxidant such as hydrogen peroxide or nitrous acid.

The above-mentioned reactions are carried out in the usual manner, preferably in presence of a solvent, at room temperature or with cooling or heating and optionally under superatmospheric pressure.

Depending on the starting materials and reaction conditions used the new compounds are obtained in free form or in form of their salts which are likewise included in the present invention. The salts of the new compounds may be converted into the free compounds in known manner, for example acid addition salts by reaction with a basic agent. On the other hand, a resulting free base may form salts with inorganic or organic acids. For the manufacture of acid addition salts preferred use is made of therapeutically acceptable acids, for example hydrohalic acids, for instance hydrochloric or hydrobromic acid, nitric or thiocyanic acid, sulphuric or phosphoric acids, or of organic acids such as formic, acetic, propionic, glycollic, lactic, pyruvic, malonic, succinic, maleic, fumaric, malic, tartaric, citric ascorbic, hydroxymaleic, dihydroxymaleic, benzoic, phenylacetic 4-aminobenzoic, 4-hydroxybenzoic, anthranilic, cinnamic, mandelic, salicylic, 4-aminosalicylic, 2-phenoxybenzoic, 2-acetoxybenzoic, methanesulphonic, ethanesulphonic, hydroxyethanesulphonic, benzenesulphonic, p-toluenesulphonic, embonic, naphthalenesulphonic or sulphanilic acid; or methionine, tryptophan, lysine or arginine.

These or other salts of the new compounds, for example their picrates or perchlorates, can also be used for purifying the resulting free bases by converting the bases into salts, separating the salts and liberating the bases again from the salts. In view of the close relationship between the new compounds in free form and in form of their salts, what has been said above and hereinafter with reference to the free bases concerns also the corresponding salts wherever possible and useful.

The invention includes also any variant of the process in which an intermediate obtainable at any stage of the process is used as starting material and the remaining process steps are carried out, or in which a starting material is formed under the reaction conditions or a reactant may be used in form of a salt thereof.

For example, a compound of the formula

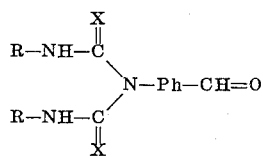

in which R, X, and Ph have the meanings given above, or a functional derivative thereof, may be reacted with the guanylhydrazine. The corresponding compound of Formula II is formed intermediately, for example under the preferred reaction conditions given above, which is then reacted with the guanylhydrazine according to the invention.

The starting materials are known or insofar as they are new they may be prepared by known methods.

The new starting materials, particularly the N'-R-ureido-benzaldehydes and the N'-R-thioureido-benzaldehydes and their acetals, for example di-lower alkyl acetals, or lower alkylene acetals, for example ethylene acetals, are also included within the scope of the invention. These compounds may be prepared in a manner known per se when an aminobenzaldehyde or a reactive, functional oxo derivative thereof is reacted with an R-isocyanate or R-isothiocyanate.

The new compounds may be used, for example, in form of pharmaceutical preparations containing the active ingredient in the free form or in the form of a therapeutically acceptable salt thereof, in admixture or conjunction with a solid or liquid pharmaceutical organic or inorganic excipient suitable for enteral or parenteral administration. Suitable excipients are substances that do not react with the new compounds, such, for example, as water, gelatin, lactose, starches, stearyl alcohol, magnesion stearate, talcum, vegetable oils, benzyl alcohols, gums, propyleneglycol, white petroleum jelly or other known medicinal excipients. The pharmaceutical preparations may be, for example, tablets, dragees, capsules or suppositories, or in liquid form solutions (e.g., elixirs or syrups), suspensions or emulsions. They may be sterilized and/or may contain assistants such as preserving, stabilizing, wetting or emulsifying agents, solution promoters or salts for regulating the osmotic pressure or buffers. They may also contain other therapeutically valuable substances. The pharmaceutical preparations are formulated by known methods.

The pharmaceutical preparations particularly those for reducing blood pressure for enteral, for example oral, administration contain advantageously about 1 to 60 percent of active ingredient or about 5 to 150 mg, especially 20 to 60 mg, of the active substance per unit dose.

The amount of excipient may vary within wide limits and depends primarily on the form of administration of the preparations.

The daily dose depends on the form of administration and on the requirements of the individual patient; it is easily determined by the attending physician. For example it is one to three separate doses.

The invention further provides a method of lowering the blood pressure or increasing the contraction power of the heart muscle, characterized in that an appropriate compound of the formula I, for example in the form of a pharmaceutical preparation, is administered to a warm-blooded being.

The following non-limiting examples illustrate the invention.

EXAMPLE 1

A suspension of 19.6 g (0.144 mol) of aminoguanidine bicarbonate in 30 ml of water is mixed with 31 ml of 6.15N-hydrochloric acid (0.19 mol), then a suspension of 22.22 g (0.1 mol) of p-(N'-methylureido)-benzaldehyde ethylene acetal in 125 ml of methanol is added to the resulting clear solution. After a short time a solution iS obtained which is stirred for 10 hours at 70° C (reflux), filtered and cooled, whereupon crystallization sets in spontaneously. The crystals are suctioned off, suspended in 80 ml of water, once more suctioned, dissolved in ethanol and crystallized by adding a 1:1-mixture of ethanol:ethyl acetate, to yield p-(N'-methylureido)-benzaldehyde-guanylhydrazone hydrochloride of the formula

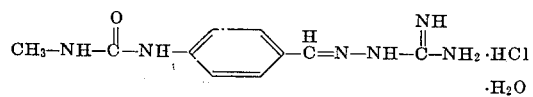

which sinters at 118°–119° C, then solidifies again and melts at 218°–221° C with decomposition. The product is dried at 80° C; it contains 1 mol of water of crystallization. On drying at 100° C under a high vacuum a very hygroscopic product is obtained which is free from water of crystallization.

Crystallization from 95 percent ethanol gives a non-hygroscopic hydrochloride which melts at 215°–217° C (with decomposition) and contains no crystal water. Both crystal forms display the same nuclear resonance, I.R. and U.V. spectra.

From the aqueous solution of the two crystal forms the same base of melting point 208°–209° C (decomposition) is obtained with 2N-sodium hydroxide solution.

p-(N'-methylureido)-benzaldehyde ethylene acetal used as starting material may be prepared in the following manner:

39.04 grams (0.2 mol) of p-nitrobenzaldehyde ethylene acetal are hydrogenated in tetrahydrofuran with platinum oxide as catalyst. The hydrogenation is complete after about 40 minutes. The resulting, relatively unstable p-aminobenzaldehyde ethylene acetal is not isolated but further processed thus:

The tetrahydrofuran solution is filtered off the platinum, concentrated to about 150 ml, and while cooling with ice water this solution is dropped into a solution of 12.5 g (0.22 mol) of methylisocyanate in 150 ml of tetrahydrofuran. The batch is stirred for 16 hours at room temperature. After only 30 minutes crystallization sets in. The crystals are suctioned off and yield p-(N'-methylureido)-benzaldehyde ethylene acetal ( = 2-[p-(N'-methylureido)-phenyl]-1,3-dioxolan) of the formula

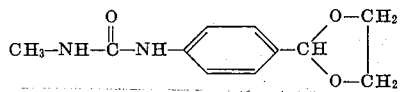

melting at 181° C.

EXAMPLE 2

A suspension of 19.6 g (0.144 mol) of aminoguanidine bicarbonate in 30 ml of water is mixed with 31 ml of 6.15N-hydrochloric acid (0.19 mol), and the resulting clear solution is mixed with a solution of 21.21 g (0.085 mol) of p-(N'-propylureido)-benzaldehyde ethylene acetal in 125 ml of methanol. The solution formed is stirred for 10 hours at 78° C (reflux), then evaporated in vacuo, the crystalline residue treated with 50 ml of water, suctioned off, dissolved in 60 ml of ethanol and crystallized by adding 60 ml of ethyl acetate, to yield p-(N'-propylureido)-benzaldehyde-guanylhydrazone hydrochloride of the formula

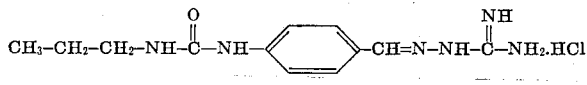

melting at 201°–203° C.

The p-(N'-propylureido)-benzaldehyde ethylene acetal used as starting material is accessible in the following manner:

39.04 g (0.2 mol) of p-nitrobenzaldehyde ethylene aceta are hydrogenated in tetrahydrofuran with platinum oxide as catalyst. The hydrogenation is complete after about 40 minutes. The resulting, relatively unstable p-aminobenzaldehyde ethylene acetal is not isolated but further processed as follows:

The tetrahydrofuran solution is filtered off the platinum, concentrated to about 150 ml and this solution is dropped with ice cooling into a solution of 21.27 g (0.25 mol) of propylisocyanate in 150 ml of tetrahydrofuran. The batch is stirred for 16 hours at room temperature. The reaction mixture is filtered and the filtrate concentrated in vacuo to 100 ml. On completion of the crystallization the crystals are suctioned off, dissolved in hot tetrahydrofuran (in which the polymer formed as a by-product is insoluble) and filtered hot. On cooling, p-(N'-propylureido)-benzaldehyde ethylene acetal ( = 2- [p-(N'-propylureido)-phenyl]-1,3-dioxolan) melting at 139°–142° C, is obtained.

EXAMPLE 3

A suspension of 19.6 g (0.144 mol) of aminoguanidine bicarbonate in 30 ml of water is mixed with 31 ml of 6.15N-hydrochloric acid (0.19 mol). The resulting solution is mixed with a solution of 28.43 g (0.1 mol) of p-(N'-phenylureido)-benzaldehyde ethylene acetal in 200 ml of methanol. The solution is refluxed for 16 hours, then filtered and evaporated to dryness. The residue is suspended in 150 ml of water, filtered, and recrystallized from 100 ml of ethanol, to yield p-(N'-phenylureido)-benzaldehyde-guanylhydrazone hydrochloride of the formula

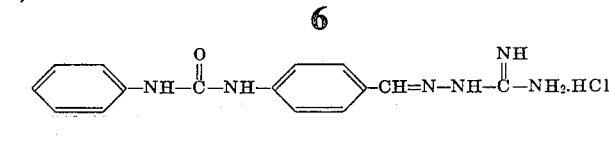

in the form of yellowish crystals melting at 230°–233° C.

The p-(N'-phenylureido)-benzaldehyde ethylene acetal used as starting material may be prepared thus:

39.04 grams (0.2 mol) of p-nitrobenzaldehyde ethylene acetal are hydrogenated in tetrahydrofuran with platinum oxide as catalyst. The hydrogenation is complete after about 40 minutes. The resulting, relatively unstable p-aminobenzaldehyde ethylene acetal is not isolated but further processed as follows:

The tetrahydrofuran solution is filtered off the platinum, concentrated to about 150 ml, and this solution is dropped into a solution of 26.2 g (0.22 mol) of phenylisocyanate in 150 ml of tetrahydrofuran. The batch is stirred for 16 hours at 50° C, then filtered and the filtrate evaporated under vacuum. The residual resin is dissolved in ethanol, concentrated and crystallized by adding ethyl acetate, to yield p-(N'-phenylureido)-benzaldehyde ethylene acetal ( = 2-[p-(N'-phenylureido)-phenyl]-1,3-dioxolan) melting at 141°–146° C.

EXAMPLE 4

A suspension of 19.6 g (0.144 mol) of aminoguanidine bicarbonate in 30 ml of water is mixed with 31 ml of 6.15N-hydrochloric acid (0.19 mol). The resulting clear solution is mixed with a solution of 22.22 g (0.1 mol) of m-(N'-methylureido)-benzaldehyde ethylene acetal in 125 ml of methanol. The solution is stirred for 10 hours in a bath heated at 70° C, then filtered, cooled and evaporated to dryness in vacuo, and the crystalline residue is suspended in 75 ml of water. The insoluble phase is suctioned off and washed with a small quantity of water, to yield m-(N'-methylureido)-benzaldehyde-guanylhydrazone hydrochloride of the formula

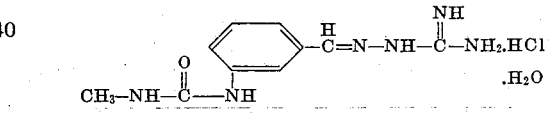

which crystallizes with water of crystallization. It melts at 100°–104° C, then solidifies again on further heating and decomposes between 150° and 170° C. After drying at 100° C under a high vacuum it melts at about 135° C.

When from an aqueous solution of this hydrochloride the base is precipitated with dilute sodium hydroxide solution, m-(N'-methylureido)-benzaldehyde-guanylhydrazone melting (with decomposition) at 198° C is obtained in analytically pure form.

From m-(N'-methylureido)-benzaldehyde ethylene acetal used as starting material may be prepared in the following manner:

39.02 grams (0.2 mol) of m-nitrobenzaldehyde ethylene acetal are hydrogenated in tetrahydrofuran with platinum oxide as catalyst. The hydrogenation takes about 40 minutes to completion. The resulting, relatively unstable m-aminobenzaldehyde ethylene acetal is immediately dropped, while cooling with ice, into a solution of 13.12 g of methylisocyanate (0.23 mol) in 150 ml of tetrahydrofuran, and the mixture is stirred for 14 hours at room temperature. The batch is filtered, concentrated in vacuo to 100 ml, to yield m-(N'-methylureido)-benzaldehyde ethylene acetal melting at 121°–123° C.

EXAMPLE 5

19.6 g (0.144 mol) of aminoguanidine bicarbonate are suspended in 30 ml of water and converted into the hydrochloride with 31 ml of 6.15N-hydrochloric acid. To the clear solution are added 22.22 g (0.1 mol) of ortho-(N'-methylureido)-benzaldehyde ethylene acetal, dissolved in 125 ml of methanol. The batch is heated at 70° C for 10 hours while stirring, then filtered, and evaporated to dryness under vacuum, whereupon crystallization sets in slowly. Recrystallization from methanol gives ortho-(N'-methylureido)-benzaldehyde-guanyl-hydrazone hydrochloride of the formula

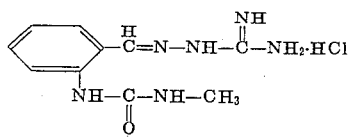

which melts at 212°–216° C.

From the air, the crystals take up 1–2 mols of water.

The ortho-(N'-methyl-uredio)-benzaldehyde-ethyleneacetal used as starting material can be obtained as follows:

ortho-nitrobenzaldehyde is reacted with ethylene glycol in toluene in the presence of para-toluenesulfonic acid to form ortho-nitrobenzaldehyde ethylene acetal. This product is hydrogenated in tetrahydrofuran using platinum oxide as catalyst. After the hydrogenation, the catalyst is filtered off the reaction mixture, and the resulting solution is treated with methylisocyanate. There is obtained in this manner ortho-(N'-methylureido)-benzaldehyde ethylene acetal which crystallizes out of the tetrahydrofuran solution. Melting point, 151°–153° C.

EXAMPLE 6

19.6 g (0.144 mol) of aminoguanidine bicarbonate are suspended in 30 ml of water and treated with 17.3 g of methane-sulfonic acid in 70 ml of water. To the resulting clear solution are added 22.22 g (0.1 mol) of para-(N'-methylureido)-benzaldehyde ethylene acetal, suspended in 125 ml of methanol. After a short while, dissolution sets in. The batch is stirred for 10 hours at 70° C (reflux), then filtered. The solution is evaporated and the residue dissolved in 50 to 75 ml of water When the resulting solution is cooled, para-(N'-methylureido)-benzaldehyde-guanylhydrazone methanesulfonate of the formula

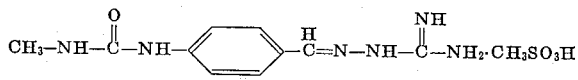

crystallizes out. It contains no water of crystallization. Melting point, 206°–208° C.

From an aqueous solution of the methane sulfonate, the base can be precipitated with 2N-sodium hydroxide solution. This base is identical with that obtained according to Example 1.

When a solution of the base in dimethylformamide is treated with the calculated quantity of D-tartaric acid in ethanol, the corresponding acid D-tartrate crystallizes out. Melting point, 198°–200° C.

EXAMPLE 7

19.6 g (0.144 mol) of aminoguanidine bicarbonate are suspended in 30 ml of water and the suspension treated with 31 ml of 6.15N-hydrochloric acid (0.19 mol). To the resulting clear solution is added a suspension of 17.8 g of para-(N'-methylureido)-benzaldehyde in 125 ml of methanol. The batch is stirred for 10 hours at 70° C (reflux), then filtered and cooled, whereupon crystallization sets in spontaneously. Recrystallization as described in Example 1 gives para-(N'-methylureido)-benzaldehyde-guanylhydrazone hydrochloride which is identical with the product described in Example 1.

The para-(N'-methylureido)-benzaldehyde used as starting material can be obtained as follows:

36 g of para-(N'-methylureido)-benzaldehyde ethylene acetal and 200 ml of 2N-hydrochloric acid are stirred in 720 ml of methanol for 1 hour at room temperature, concentrated until crystallization sets in, and treated with 700 ml of water. In this manner, para-(N'-methylureido)-benzaldehyde is obtained which melts at 195°–197° C with decomposition).

EXAMPLE 8

19.6 g (0.144 mol) of aminoguanidine bicarbonate are suspended in 30 ml of water and the suspension treated with 31 ml of 6.15N-hydrOchloric acid (0.19 mol). To the resulting clear solution is added a solution of 19.43 g (0.1 mol) of para-(N'-methylthioureido)-benzaldehyde, dissolved in 125 ml of dimethylformamide. The batch is heated for 14 hours at an internal temperature of 70° C, then evaporated in vacuo, and the residue dissolved in 125 ml of water, and allowed to crystallize. In this manner, para-(N'-methylthioureido)-benzaldehyde-guanylhydrazone hydrochloride of the formula

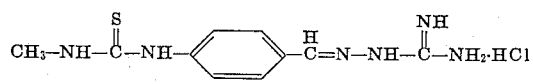

is obtained which melts at 215°–217° C (with decomposition).

The para-(N'-methyl-thioureido)-benzaldehyde used as starting material can be obtained as follows:

Methylamine is introduced into a solution of 32.6 g of para-formyl-phenyl-isothiocyanate in 200 ml of tetrahydrofuran for 1 hour at room temperature and for 2 hours under reflux. The batch is evaporated under vacuum. For saponification of the Schiff's base, the resinous residue is dissolved in 40 ml of dimethylformamide and the solution poured into a boiling mixture of 400 ml of 2N-hydrochloric acid and 200 ml of water. The resin present is filtered off hot, the filtrate is cooled, and para-(N'-methylthioureido)-benzaldehyde obtained in the form of an oil which crystallizes in the form of yellow needles. Melting point, 136°–139° C.

EXAMPLE 9

A suspension of 19.6 g (0.144 mol) of aminoguanidine bicarbonate in 30 ml of water is treated with 31 ml of 6.15N-hydrochloric acid. To the clear solution is added a solution of 29.04 g of para-(N'-cyclohexylureido)-benzaldehyde ethylene acetal in 125 ml of methanol. The batch is stirred for 10 hours at 70° C, then filtered, the filtrate evaporated under reduced pressure, the crystalline residue is suspended in 100 ml of water, the suspension filtered with suction, and the filter residue recrystallized from ethanol. In this manner, para-(N'-cyclohexylureido)-benzaldehyde-guanylhydrazone hydrochloride of the formula

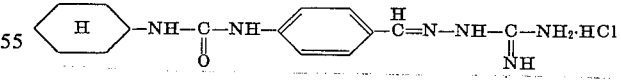

is obtained which melts at 179°–182° C.

The para-(N'-cyclohexylureido)-benzaldehyde ethylene acetal used as starting material can be obtained as follows:

39.04 g (0.2 mol) of para-nitrobenzaldehyde ethylene acetal are hydrogenated in tetrahydrofuran using platinum oxide as catalyst. Hydrogenation is complete after about 40 minutes. The resulting, relatively unstable, para-benzaldehyde ethylene acetal is not isolated, but processed as follows:

The tetrahydrofuran solution is filtered to remove the platinum, the filtrate concentrated to about 150 ml, and added dropwise to a solution of 27.53 g (0.22 mol) of cyclohexyl-isocyanate in 150 ml of tetrahydrofuran while cooling with ice-water. The batch is stirred at room temperature for 16 hours. After some time crystallization sets in. Filtering with suction gives the para-(N'-cyclohexylureido)-benzaldehyde ethylene acetal ( = 2-[para-(N'-cyclohexylureido)-phenyl]-1,3-dioxalan) which melts at 195°–197° C.

EXAMPLE 10

19.6 g (0.144 mol) of aminoguanidine bicarbonate, suspended in 30 ml of water, are converted into the hydrochloride with 30.76 ml of 6.15N-hydrochloric acid. To the resulting solution are added 29.04 g of ortho-(N'-cyclohexyl-ureido)-benzaldehyde ethylene acetal, dissolved in 125 ml of methanol, and the mixture stirred at 70° C for 10 hours. The clear solution is filtered, concentrated, freed from a small amount of precipitate, and evaporated to dryness under reduced pressure. The residue is dissolved in 200 ml of water, and filtered to clarify the solution. The latter is treated with 75 ml of 2N-sodium hydroxide solution, and the crystals which separate are filtered off with suction and washed with water. In this manner, ortho-(N'-cyclohexylureido)-benzaldehyde-guanylhydrazone of the formula

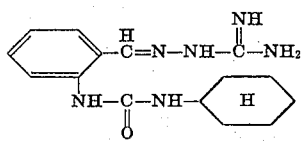

is obtained which melts at 155°–170° C.

The ortho-(N'-cyclohexyl-ureido)-benzaldehyde ethylene acetal used as starting material can be prepared as follows:

39.04 g (0.2 mol) of para-nitrobenzaldehyde ethylene acetal are hydrogenated in tetrahydrofuran using platinum oxide as catalyst. Hydrogenation ceases after about 40 minutes. The resulting, relatively unstable, para-aminobenzaldehyde ethylene acetal is not isolated, but further processed as follows.

The tetrahydrofuran solution is freed from the platinum by filtration, concentrated to about 150 ml, and then added dropwise to a solution of 27.53 g (0.22 mol) of cyclohexyl-isocyanate in 150 ml of tetrahydrofuran while cooling with ice-water. The batch is stirred for 16 hours at room temperature, then evaporated to dryness under reduced pressure and the residue recrystallized from 250 ml of ethyl acetate. In this manner, ortho-(N'-cyclohexylureido-benzaldehyde-ethylene acetal ( 2-[ortho-(N'-cyclohexylureido)-phenyl]-1,3-dioxolan) is obtained which melts at 135°–136° C.

EXAMPLE 11

A suspension of 19.6 g (0.144 mol) of aminoguanidine bicarbonate in 30 ml of water is treated with 31 ml of 6.15N-hydrochloric acid (0.19 mol). To the resulting clear solution is added a suspension of 31.88 g (0.1 mol) of para-[N'-(para-chlorophenyl)-ureido]-benzaldehyde ethylene acetal in 200 ml of methanol. The whole is heated at 70° C for 16 hours, para-[N'-(para-chlorophenyl)-ureido]-benzaldehyde-guanylhydrazone hydrochloride of the formula

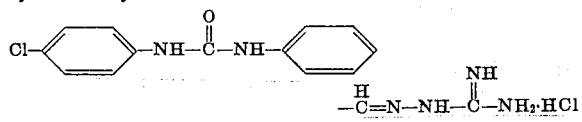

crystallizing out after some time as a sandy, yellowish product. It melts at 260°–262° C (with decomposition). The product is filtered off with suction and washed with water.

This difficulty soluble salt is dissolved warm in 200 ml of dimethylformamide and the solution treated first with 200 ml of 2N-sodium hydroxide solution and then with 200 ml of water. The resulting crystallizate is filtered off with suction and washed with water and ethanol. In this manner, the free base of melting point 212°–213° C is obtained.

The resulting base is dissolved in 125 ml of dimethyl-formamide with the application of heat (80° C), cooled, and then treated with 8 ml of methanesulfonic acid in a small amount of water, and then with 300 ml of water. The methanesulfonate of para-[N'-(para-chlorophenyl)-ureido]-benzaldehyde-guanyl-hydrazone melts at 237°–239° c.

The para-[N'-(para-chlorophenyl)-ureido]-benzaldehyde ethylene acetal used as starting material can be prepared as follows:

39.04 g (0.2 mol) of para-nitrobenzaldehyde ethylene acetal are hydrogenated in tetrahydrofuran using platinum oxide as catalyst. Hydrogenation is complete after about 40 minutes. The resulting, relatively unstable, para-aminobenzaldehyde-ethylene-acetal is not isolated, but processed as follows:

The tetrahydrofuran solution is freed from the platinum, concentrated to about 150 ml, and added dropwise to a solution of 33.78 g (0.22 mol) of para-chlorophenyl-isocyanate in 150 ml of tetrahydrofuran. The batch is stirred for 16 hours at 50° C. The crystals which separate are filtered off. In this manner, para-[N'-(para-chlorophenyl)-ureido]-benzaldehyde ethylene acetal of melting point 223°–224° C is obtained.

By hydrolyzing the acetal with dilute acid, para-[N'-(para-chlorophenyl)-ureido]-benzaldehyde can be obtained in the form of yellow crystals which melt at 203°–206° C, solidify again, and decompose at 225° C.

The afore-described guanylhydrazone hydrochloride can also be obtained by reacting this aldehyde with aminoguanidine hydrochloride.

EXAMPLE 12

A suspension of 19.6 g (0.144 mol) of aminoguanidine bicarbonate in 30 ml of water is treated with 17.3 g (0.18 mol) of methane-sulfonic acid in 40 ml of water. To the clear solution are added 29.83 g of para-[N'-(ortho-tolyl)-ureido]-benzaldehyde ethylene acetal in 200 ml of methanol. The batch is stirred for 16 hours at 70° C, then filtered and cooled, whereupon crystallization sets in immediately. The crystals are isolated and washed with methanol, recrystallized from 200 ml of methanol and 70 ml of water, and para-[N'-(ortho-tolyl)-ureido]-benz-aldehyde-guanylhydrazone methanesulfonate of the formula

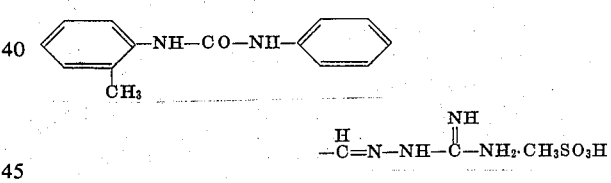

obtained.

The substance can have either of two different crystal forms. When the substance is recrystallized from aqueous methanol, it melts at 173°–176° C, and when it is recrystallized from water, it melts at 176°–180° C, and evolves gas between 190°–205° C.

The para-[N'-(ortho-tolyl)-ureido]-benzaldehyde ethylene acetal used as starting material can be prepared as follows:

39.04 g (0.2 mol) of para-nitrobenzaldehyde-ethylene acetal are hydrogenated in tetrahydrofuran using platinum oxide as catalyst. Hydrogenation ceases after about 40 minutes. The resulting, relatively unstable, para-aminobenzaldehyde ethylene acetal is not isolated, but processed as follows:

The tetrahydrofuran solution is filtered to remove the platinum, then concentrated to about 150 ml, and added dropwise to a solution of 29.29 g (0.22 mol) of ortho-tolyl-isocyanate in 150 ml of tetrahydrofuran while cooling. The batch is stirred for 16 hours at 15° C. The reaction mixture is filtered and the precipitate washed with ethanol. In this manner, para-[N'-(ortho-tolyl)-ureido]-benzaldehyde ethylene acetal of melting point 172°–174° C is obtained.

EXAMPLE 13

When instead of the para-[N'-(ortho-tolyl)-ureido]-benzaldehyde ethylene acetal described in the preceding Example, para-[bis-(ortho-tolylcarbamoyl)-amino]-benzaldehyde ethylene acetal is reacted with aminoguanidine-methanesulfonate in an analogous manner, para-[N'-ortho-tolyl)-ureido]- benzaldehyde-guanylhydrazone methanesulfonate is likewise obtained.

The para-[bis-(ortho-tolylcarbamoly)-amino]-benzaldehyde ethylene acetal of the formula

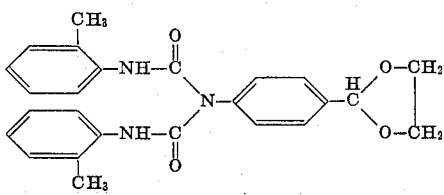

melting at 135°–133° C is obtained when the addition of para-aminobenzaldehyde ethylene acetal to ortho-tolylisocyanate described in the preceding example is performed without cooling, and stirring is then continued at 50° C.

EXAMPLE 14

A suspension of 19.6 g (0.144 mol) of aminoguanidine bicarbonate in 30 ml of water is treated with 17.3 g (0.18 mol) of methanesulfonic acid in 40 ml of water. The clear solution is treated with a suspension of 27.03 g of para-[N'-(para-methoxyphenyl)-ureido]-benzaldehyde in 200 ml of methanol. The batch is stirred at 70° C. for 10 hours, filtered, cooled, and the crystals that form are isolated. They are suspended in 120 ml of water and again isolated. Recrystallization must be performed with great care because the product tends to form a jelly. In this manner, para-[N'-(para-methoxyphenyl)-ureido]-benzaldehyde-guanylhydrazone-methanesulfonate of the formula

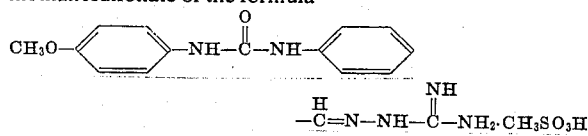

is obtained which melts at 182°–186° C.

The base can be liberated by dissolving the salt in water and treating the solution with 2N-sodium hydroxide solution. The base melts at 195°–199° C.

The para-[N'-(para-methoxyphenyl)-ureido]-benzaldehyde used as starting material can be prepared as follows:

39.04 g (0.2 mol) of para-nitrobenzaldehyde ethylene acetal are hydrogenated in tetrahydrofuran using platinum oxide as catalyst. Hydrogenation is finished after about 40 minutes. The resulting, relatively unstable, para-aminobenzaldehyde ethylene acetal is not isolated, but processed as follows:

The tetrahydrofuran solution which contains about 0.4 mol of water stemming from the hydrogenation is filtered to remove the platinum, then concentrated to about 150 ml, and added dropwise to a solution of 32.81 g of para-methoxyphenyl-isocyanate in 150 ml of tetrahydrofuran while cooling. The batch is stirred at 20° C for 16 hours. It is then filtered and the filtrate concentrated under reduced pressure, crystallization taking place. In this manner, para-[N'-(para-methoxyphenyl)-ureido]-benzaldehyde of melting point 207°–209° C is obtained as main product.

In absolute solvents, the corresponding ethylene acetal of melting point 165° C is obtained which with aminoguanidine-methanesulfonate yields the afore-described guanylhydrazone.

EXAMPLE 15

19.6 g (0.144 mol) of aminoguanidine bicarbonate, suspended in 30 ml of water, are converted into the hydrochloride with 30.75 ml of 6.15N-hydrochloric acid (0.19 mol). The clear solution is treated with 25.42 g (0.1 mol) of para-(N'-benzyl-ureido)-benzaldhyde in 125 ml of methanol, and the mixture stirred for 10 hours at a bath temperature of 70° C. The batch is filtered, the filtrate evaporated under reduced pressure, and the residue recrystallized from 100 ml of ethanol. In this manner, para-(N'-benzylureido)-benzaldehyde-guanylhydrazone hydrochloride of the formula

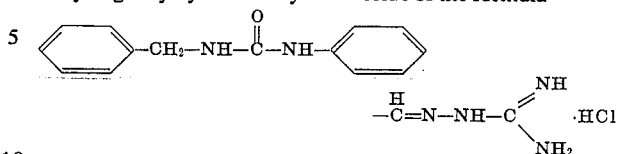

is obtained which melts at (143) 149° C.

The para-(N'-benzylureido)-benzaldehyde used as starting material can be obtained as follows:

39.04 g (0.2 mol) of para-nitrobenzaldehyde ethylene acetal are hydrogenated in tetrahydrofuran using platinum oxide as catalyst. The hydrogenation is complete after about 40 minutes. The resulting, relatively unstable, para-aminobenzaldehyde ethylene acetal is not isolated, but processed as follows:

The tetrahydrofuran solution is filtered to remove the platinum, concentrated to about 150 ml, and added dropwise to a solution of 29.29 g of benzylisocyanate in 150 ml of tetrahydrofuran while cooling with ice-water. The batch is stirred at room temperature for 16 hours, the acetal group being hydrolyzed by the water present. On concentration in vacuo, crystallization sets in. The batch is filtered, and para-(N'-benzylureido)-benzaldehyde of melting point 163°–168° C obtained.

EXAMPLE 16

5.7 g (0.02 mol) of para-(N'-methyl-thioureido)-benzaldehyde-guanylhydrazone hydrochloride are suspended in 200 ml. of 2N-sodium hydroxide solution, the base separating quickly. While stirring, 35 ml of 30 percent hydrogen peroxide are added dropwise at 40° C, and the batch allowed to stand at 40° C for another 3 hours. It is then heated to 70° C for 5 minutes, cooled, the crystals filtered off with suction and washed with water and ethanol. The crude base so obtained (melting point about 205° C) is suspended in a little 50 percent ethanol and the suspension treated with a few drops of methane-sulfonic acid to achieve an acid reaction. More ethanol is added, the whole concentrated to about 25 ml, and treated with another 30 ml of ethanol, whereupon crystallization sets in. In this manner, para-(N'-methyl-ureido)-benzaldehyde-guanyl-hydrazone-methanesulfonate of melting point 206°–208° C is obtained which is identical with the product described in Example 6.

EXAMPLE 17

Tablets, each containing 50 mg of active substance, may be manufactured, for example, for the following ingredients in the manner described below:

| Composition | mg |
| --- | --- |
| p-(N'-Methylureido)-benzaldehyde-guanylhydrazone hydrochloride | 50.0 |
| lactose | 70.0 |
| wheat starch | 45.0 |
| gelatin | 4.0 |
| arrowroot | 20.0 |
| magnesium stearate | 1.0 |
| talcum | 10.0 |
| Total: | 200.0 mg |

Preparation p-(N'-Methylureido)-benzaldehyde-guanylhydrazone hydrochloride is homogeneously mixed with lactose and wheat starch and the mixture is passed through a sieve of 0.5 mm mesh width. Gelatin is dissolved in 10 times its own weight of water, the powder mixture is evenly moistened with this solution and the whole is kneaded until a plastic mass has formed which is passed through a sieve of 3 mm mesh width, dried at a temperature not exceeding 45° C and then passed through a sieve of 1.5 mm mesh width. Arrowroot, magnesium stearate and finely strained talcum are admixed with the resulting granulate and after another homogenization the paste is made in the usual manner into scored tablets weighing 200 mg and of 8 mm diameter.

EXAMPLE 18

In an analogous manner to that described in Example 15 there can be prepared para-[N′-(m-trifluoromethylbenzyl)-ureido]-benzaldehyde-guanylhydrazone and its hydrochloride.

I claim:

1. A member selected from the group consisting of compounds of the formula

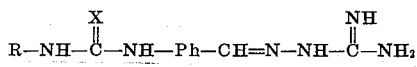

in which R stands for a member selected from the group consisting of lower alkyl, cyclo-lower alkyl, cyclo-lower alkyl-lower alkyl and groups of the formulas

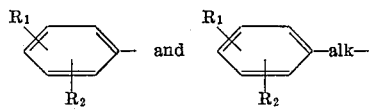

alk standing for lower alkylene and $R_1$ and $R_2$ each standing for a member selected from the group consisting of hydrogen, lower alkyl, lower alkoxy, halogen and trifluoromethyl, X stands for a member selected from the group consisting of oxygen and sulfur and Ph for a member selected from the group consisting of phenylene, lower-alkylated phenylene, lower alkoxylated phenylene, halogenated phenylene and trifluoromethylated phenylene, and salts thereof with pharmeceutically acceptable acids.

2. A product as claimed in claim 1 in which Ph stands for phenylene and R for lower alkyl.

3. A product as claimed in claim 2 in which X stands for oxygen and Ph for a member selected from the group consisting of meta-phenylene and para-phenylene.

4. A product as claimed in claim 1 in which R stands for a member selected from the group consisting of n-propyl and cyclohexyl, Ph for para-phenylene and X for oxygen.

5. A product as claimed in claim 1 in which R stands for a member selected from the group consisting of methyl and cyclohexyl, Ph for ortho-phenylene and X for oxygen.

6. A product as claimed in claim 1 which product is the p-(N′-Methylureido)-benzaldehyde guanylhydrazone of the formula

or salts thereof with pharmaceutically acceptable acids.

7. A product as claimed in claim 1 which product is the m-(N′-Methylureido)-benzaldehyde guanylhydrazone or salts thereof with pharmaceutically acceptable acids.

8. A product as claimed in claim 1 which product is the p-(N′-Methylthioureido)-benzaldehyde guanylhydrazone or salts thereof with pharmaceutically acceptable acids.

9. A product as claimed in claim 1 in which R stands for a member selected from the group consisting of phenyl, lower alkyl-phenyl, lower alkoxyphenyl, halogenophenyl and trifluoromethylphenyl and Ph stands for phenylene.

10. A product as claimed in claim 9 in which Ph stands for a member selected from the group consisting of meta-phenylene and para-phenylene and X for oxygen.

11. A product as claimed in claim 10 in which Ph stands for para-phenylene.

12. A product as claimed in claim 1 in which R stands for a member selected from the group consisting of para-chlorophenyl, p-methoxyphenyl and benzyl, Ph for para-phenylene and X for oxygen.

13. A product as claimed in claim 1 which product is the p-[N′-(o-tolyl)-ureido]-benzaldehyde guanylhydrazone or or salts thereof with pharmaceutically acceptable acids.

14. A product as claimed in claim 1 which product is the p-(N′-phenylureido)-benzaldehyde guanylhydrazone or or salts thereof with pharmaceutically acceptable acids.

* * * * *

PO-1050
(5/69)

UNITED STATES PATENT OFFICE
CERTIFICATE OF CORRECTION

Patent No. 3,673,241              Dated June 27, 1972

Inventor(s) ADRIAN MARXER

It is certified that error appears in the above-identified patent and that said Letters Patent are hereby corrected as shown below:

Column 1, line 4, after "Inventor" Assignee
should read -- CIBA-GEIGY Corporation, Ardsley,
New York---.

Signed and sealed this 23rd day of April 1974.

(SEAL)
Attest:

EDWARD M.FLETCHER,JR.                C. MARSHALL DANN
Attesting Officer                    Commissioner of Patents